United States Patent [19]
Austin

[11] 3,810,351
[45] May 14, 1974

[54] MECHANICAL FRUIT PICKER
[76] Inventor: Elmer D. Austin, P.O. Box 48, Umatilla, Fla. 32784
[22] Filed: Feb. 5, 1973
[21] Appl. No.: 329,515

[52] U.S. Cl. ............................................. 56/328 R
[51] Int. Cl. ............................................. A01g 19/00
[58] Field of Search .......... 56/328 R, 330, 332, 130

[56] References Cited
UNITED STATES PATENTS
| | | | |
|---|---|---|---|
| 3,552,107 | 1/1971 | Swift | 56/328 R |
| 2,484,437 | 11/1949 | Wells | 56/328 R X |
| 3,127,725 | 4/1964 | Richardson | 56/328 R |
| 3,427,796 | 2/1969 | McCray et al. | 56/328 R |
| 3,552,106 | 1/1971 | Baxter | 56/328 R |

Primary Examiner—Russell R. Kinsey
Assistant Examiner—J. A. Oliff
Attorney, Agent, or Firm—A. Yates Dowell, Jr.

[57] ABSTRACT

An apparatus for mechanically removing fruit from trees and collecting the picked fruit in a container which can be tilted to discharge the fruit when the container is substantially filled. The apparatus includes a picker head having a rotating cylinder with a plurality of fingers or tines mounted thereon and each of such fingers is inversely curved relative to the direction of rotation of the cylinder.

8 Claims, 6 Drawing Figures

PATENTED MAY 14 1974 3,810,351
SHEET 1 OF 2
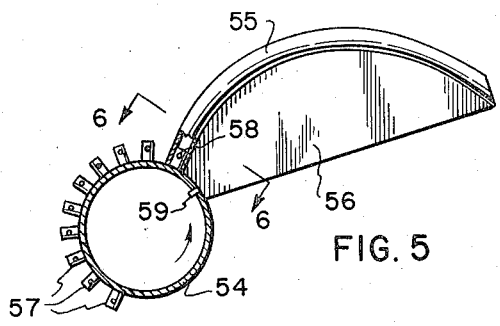
FIG. 5
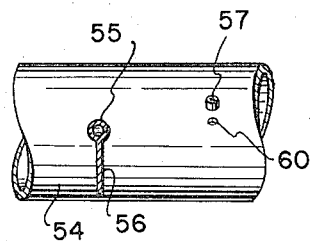
FIG. 6
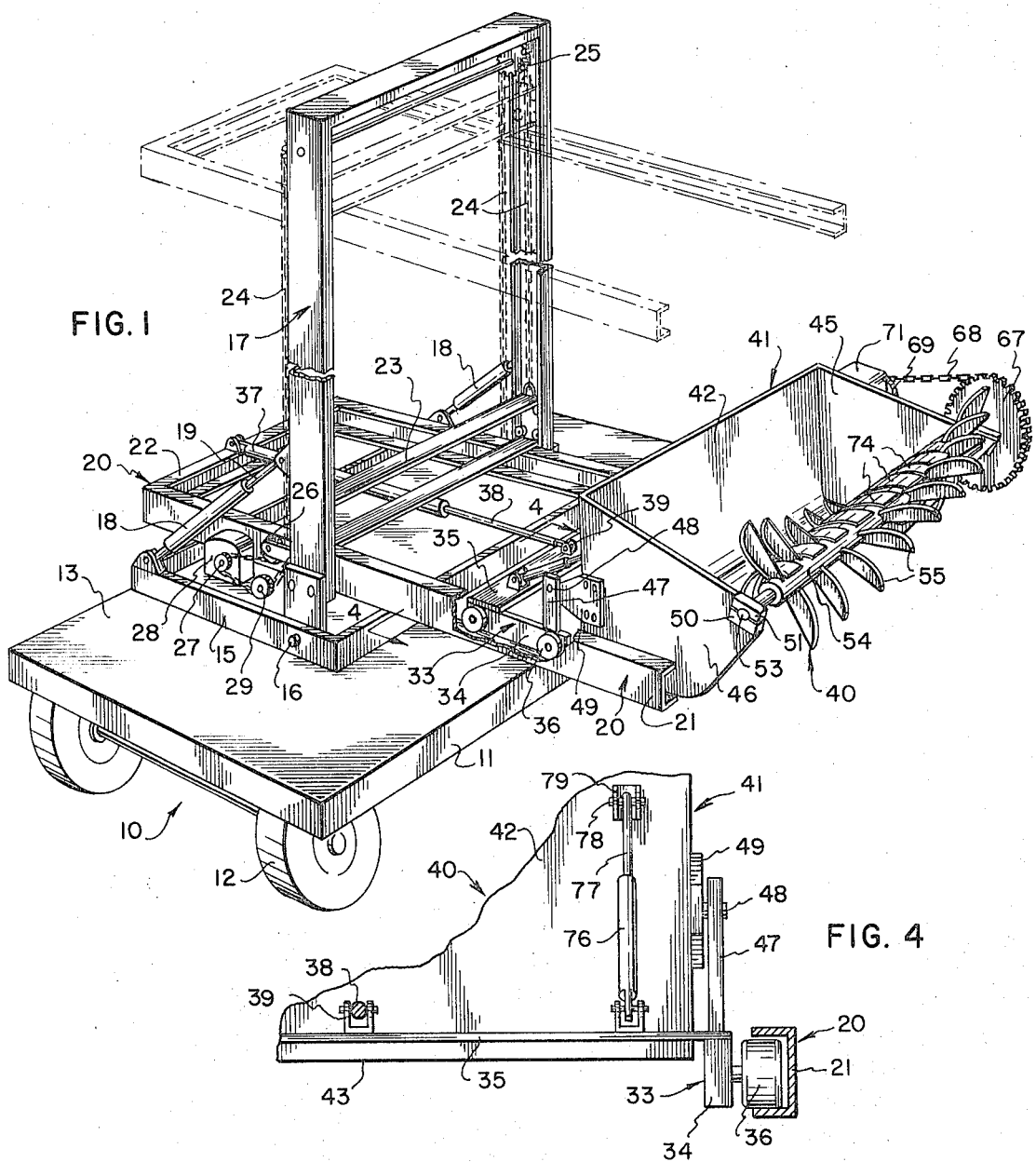
FIG. 1
FIG. 4

MECHANICAL FRUIT PICKER

BACKGROUND OF THE INVENTION

1. Field of the Invention

This invention relates generally to mechanical harvesters and relates particularly to a fruit picker having a picker head adapted to follow the contour of a tree and to remove mature fruit without bruising or damaging the same.

2. Description of the Prior Art

Historically citrus and other fruits have been harvested by workmen who twist the fruit while exerting a pulling force to remove the fruit from the limbs of the trees. The twisting of the fruit prevents a plug of the fruit skin or outer covering from being removed from the fruit.

Several varieties of fruit, particularly certain varieties of oranges, have multiple blooming periods so that one tree is capable of having fruit in several stages of maturity simultaneously and may have some fruit which is ready for harvesting while other fruit on the same tree is immature. A workman who is harvesting fruit by hand is selective and only picks mature fruit while leaving the immature fruit on the tree to ripen.

Many efforts have been made to provide means for removing fruit from the trees either mechanically or chemically since the demand for the fruit has increased while the labor force available for harvesting the fruit has shown a sharp decline. Mechanical fruit pickers normally have a rotating cylinder with a plurality of tines or fingers extending outwardly therefrom and such fingers normally are disposed either radially of the cylinder or are curved in the direction of rotation so that any fruit engaged by two or more of the fingers is removed from the tree. Some examples of this type of structure are the U.S. Pat. Nos. to Richardson 3,127,725 and the patent to Barrat 3,253,392.

It has been found that fruit harvesters having fingers disposed radially of the cylinder or curved in the direction of rotation of the cylinder tend not only to harvest fruit, but also to damage the tree by pulling limbs, branches, leaves, etc., from the tree and discharge such trash with the fruit. This is particularly true of prior art devices having fingers which pass through a comb since the angle between the fingers and the comb becomes acute as the cylinder rotates so that any limbs or other foliage is torn from the tree. Additionally, fruit which is trapped in the acute angle is frequently pinched and bruised.

Since most mechanical pickers have damaged trees, many efforts have been made to treat the fruit chemically to reduce the "pull force" necessary to remove the fruit and allow hand pickers or picking mechanisms to remove the fruit from the trees. One such chemical is cycloheximide which is marketed under the trade name Acti-Aid. After the chemical has been applied, a mechanical shaker can be attached either to the trunk of the tree or to a limb and the tree is shaken so that the fruit falls to the ground by gravity. Thereafter the fruit is harvested from the ground, either manually or mechanically.

The chemical treating and mechanical picking of fruit trees has not been satisfactory since this method removes substantially all of the fruit regardless of whether the fruit is mature or not. Also fruit falling to the ground has been bruised or otheriwse damaged so that its market value is substantially reduced.

SUMMARY OF THE INVENTION

The present invention is a mechanical fruit picker having a picker head mounted on a structure which can be selectively operated so that the picker head follows the contour of the tree from bottom to top. The picker head includes a replaceable rotating cylinder having a plurality of fingers or tines arranged spirally along the length of the cylinder and each of such fingers is curved away from the direction of rotation. The fingers pass between the teeth of an arcuate comb carried by a collection receptacle so that fruit removed from the trees by the fingers is collected within the receptacle. The fingers of the cylinder and the teeth of the comb are arranged so that the angle between the fingers and the teeth is at least 90° so that damage to the tree is substantially prevented. Normally the teeth of the picker head and the slots of the cooperating comb are spaced apart a distance such that mature fruit engages at least two of the fingers which pull the fruit from the tree, while the smaller immature fruit can pass between the fingers and remain on the tree so that it will ripen at a later date. The cylinder with the fingers mounted thereon and the comb are easily removable from the picker head so that they can be replaced by fingers having a different spacing to accommodate fruits of different sizes such as tangerines, oranges of different varieties, grapefruit and the like.

It is an object of the invention to provide a mechanical fruit picker which will remove substantially all of the mature fruit from a tree without damage to the tree or the fruit while leaving immature fruit on the tree for harvesting at a later date.

BRIEF DESCRIPTION OF THE DRAWINGS

FIG. 1 is a perspective illustrating one application of the invention.

FIG. 4 is an enlarged fragmentary section on the line 4—4 of FIG. 1.

FIG. 5 is an enlarged section of the picker head cylinder illustrating one means for mounting the fingers.

FIG. 6 is an enlarged fragmentary section on the line 6—6 of FIG. 5.

DESCRIPTION OF THE PREFERRED EMBODIMENT

Figure 3:
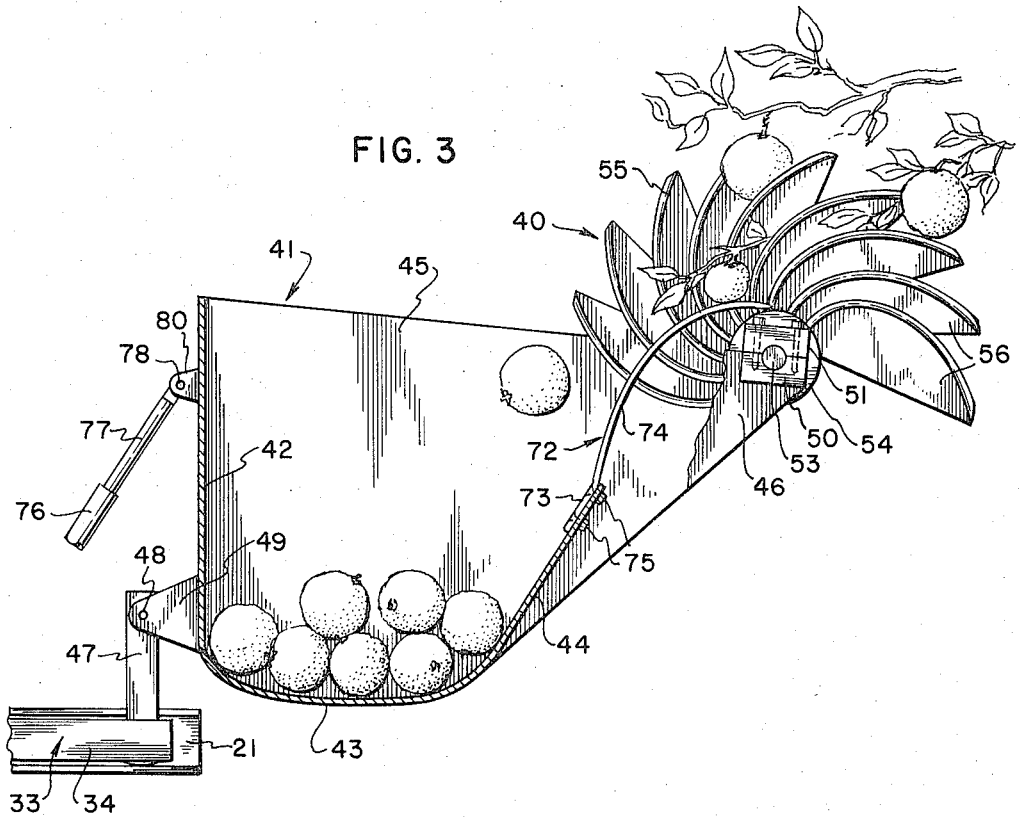
FIG. 3 is a fragmentary end view thereof.
Figure 2:
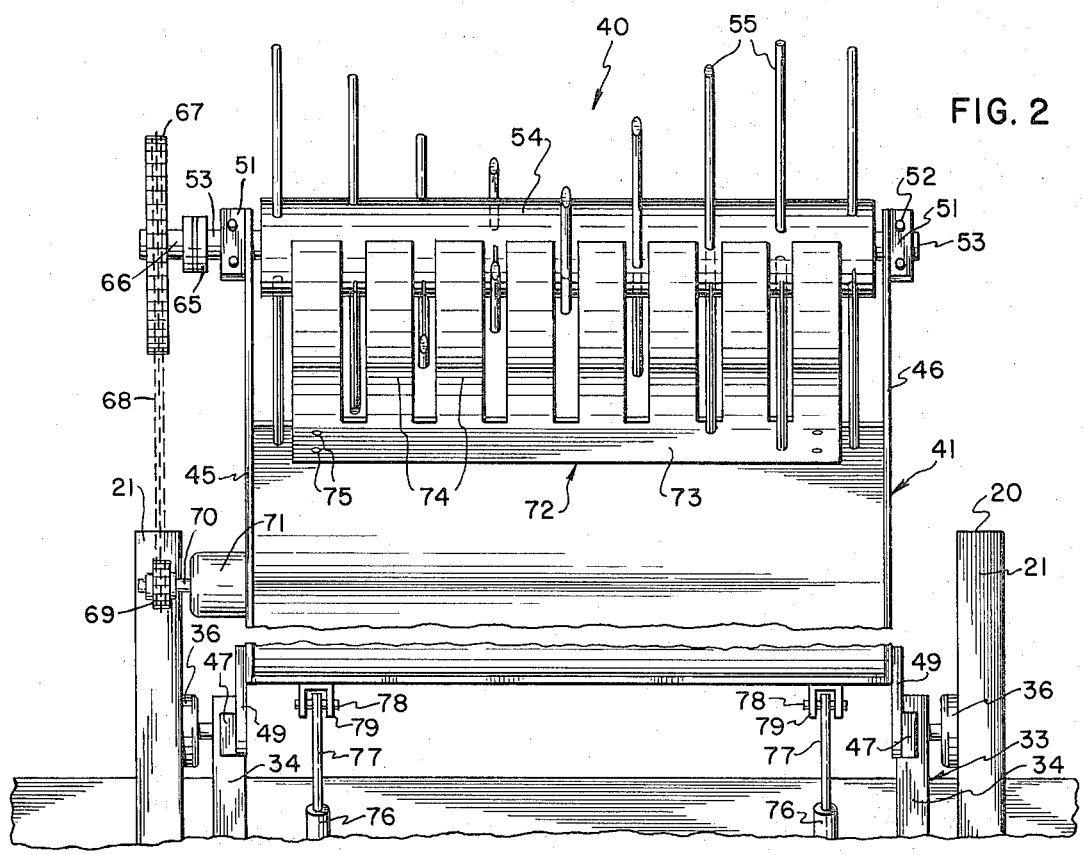
FIG. 2 is an enlarged top plan view of the picker head.

With continued reference to the drawings, a vehicle 10 is provided having a chassis 11 mounted on ground-engaging wheels 12 and having a deck or floor 13 on the chassis 11. The vehicle 10 may be self-propelled by a power plant (not shown) or if desired such vehicle can be pushed or pulled by a separate propelling vehicle. Also some or all of the wheels 12 may be steerable in any conventional manner so that the vehicle can be maneuvered through an orchard and disposed adjacent to the outer periphery of the foliage of a fruit tree.

A base frame 15 is mounted on the deck 13 and such frame is connected by a pair of aligned pivots 16 to an upright generally inverted U-shaped lift frame 17. A pair of fluid cylinders 18 are swingably connected at one end to opposite sides of the base frame 15 and each of such cylinders includes a piston rod 19 the free end of which is swingably connected to the lift frame 17 so that extension or retraction of the piston rods causes the lift frame to swing in a lateral plane about the pivot pins 16.

A picker head support frame 20 is located within the U-shaped lift frame 17 and such support frame includes a pair of generally parallel inwardly facing channel members 21 connected by an end member 22 at one end and the opposite ends of such channel members extend laterally outwardly of the vehicle 10. A bridge member 23 connects the channel members 21 intermediate their ends and such bridge member is slidably mounted on the side portions of the lift frame 17 in such a manner that the support frame 20 can be raised and lowered relative to the lift frame and the deck 13. Although the support frame can be raised in any desired manner, a pair of lift chains 24 are shown for purposes of illustration. One end of each of the chains 24 is connected to the bridge 23 and such chains extend upwardly around sprockets 25 rotatably mounted adjacent the top of the lift frame 17 and then extend downwardly about idler sprockets 26 to drive sprockets 27 carried by power plants 28. From the drive sprockets 27, the chains extend around idler sprockets 29 and the opposite ends are connected to the support frame 20 so that when the power plants 28 are operated in one direction the support frame 20 is raised, and when the power plants are operated in the other direction the support frame is lowered.

A carriage 33 having a pair of spaced generally parallel side members 34 connected by cross members 35 is movably mounted on the support frame 20 by means of wheels or rollers 36 rotatably mounted on the side members 34 and in rolling engagement with the channel members 21 of the support frame 20. In order to move the carriage 33 in and out relative to the support frame 20, a fluid cylinder 37 is mounted on the end member 22 of the support frame and such fluid cylinder is provided with a piston rod 38 the free end of which is swingably connected to a pair of upstanding lugs 39 carried by one of the cross members 35.

The structure thus far described is conventional in the prior art and forms no part of the present invention. Any other conventional manner of moving the carriage in and out, up and down, and changing the angularity thereof would be acceptable.

A picker head 40 is mounted on the carriage 33 and such picker head includes a receptacle 41 having a rear wall 42, bottom wall 43 and a front wall 44 connected together by side walls 45 and 46 to provide an open top container. In order to mount the receptacle on the carriage 33, an upstanding post 47 is welded or otherwise attached to the side members 34 of the carriage and such posts are connected by pivots 48 to lugs 49 welded or otherwise attached to the rear portion of each of the side walls 45 and 46.

At the forward end of each of the side walls 45 and 46, the lower portion 50 of a split bushing or bearing is welded or otherwise attached adjacent to the upper edge of the side walls. An upper bearing portion 51 is connected to each of the lower bearing portions 50 in any desired manner, as by bolts 52 to provide a separable bearing member for a shaft 53. It is contemplated that a bearing member could be mounted on the shaft 53 in which case the portions 50 and 51 would function as bearing retainers or clamps.

Intermediate the bearings, the shaft 53 is connected to an enlarged elongated generally cylindrical body 54 having a plurality of fingers 55 mounted thereon. Such fingers may be mounted along a straight line generally parallel with the axis of the body 54 or such fingers may be mounted along a spiral pitch line so that the fingers engage the tree foliage sequentially. As illustrated best in FIGS. 3 and 5, each of the fingers 55 is inversely curved away from the direction of rotation of the cylindrical body 54 and preferably each of the fingers is provided with a reinforcing flange or web 56 disposed behind the fingers in the direction of travel and adapted to strengthen and rigidify such fingers.

The fingers 55 may be welded or otherwise permanently attached to the cylindrical body 54, or if desired such fingers can be removably mounted so that they can be replaced in the event of damage to one or more of the fingers. One way of removably mounting the fingers on the cylindrical body 54, is illustrated in FIGS. 5 and 6. In this structure, the fingers 55 are hollow or are provided with a recess extending upwardly from one end and such fingers are adapted to receive an upwardly extending lug 57 welded or otherwise attached to the cylindrical body 54. After the finger is mounted on the lug, a roll pin or lock pin 58 is inserted through aligned openings in the finger and the lug to lock such members in assembled relationship. In order to relieve any rotary strain on the lock pin, as well as to anchor the flange 56 of each of the fingers, such flange is provided with a downwardly extending lug 59 received within openings 60 circumferentially spaced from the lugs 57.

A slip clutch 65 is mounted on one end of the shaft 53 and the other side of such slip clutch has a stub shaft 66 on which a driven sprocket 67 is mounted. The sprocket 67 is driven by a chain 68 from a drive sprocket 69 mounted on the shaft 70 of a power plant 71. Such power plant is mounted on the side wall 45 and normally the power plant sprockets and chain are covered by a housing (not shown) to prevent damage to the fruit trees.

To assist the fingers 55 in removing fruit from the trees, as well as to direct the picked fruit into the receptacle 41, a comb 72 is provided having a base 73 on which a plurality of arcuate teeth 74 are mounted. The base 73 is removably mounted on the front wall 44 of the receptacle in any desired manner, as by bolts 75. The arcuate teeth 74 of the comb are disposed between the fingers 55 of the cylindrical body 54 and are curved in an arch such that the angle between the fingers and the upper surface of the teeth is at least 90° so that an acute angle cannot be formed and thereby reduce damage to the limbs and foliage of the trees.

Limbs, foliage and fruit which engage the outer ends of the fingers 55 as the picker head is moved upwardly through the tree are merely cammed away from the teeth, as illustrated in the upper portion of FIG. 3. Mature fruits which engage the base portion of the fingers 55 cause a pulling force to be applied to the fruit since the fingers 55 are spaced apart a distance sufficient to trap mature fruit while permitting limbs, foliage and smaller immature fruit to pass therebetween. When the fingers 55 are spirally arranged along the cylindrical body 54, the engaging of two of the fingers by mature fruit causes a twisting motion on the fruit so that the fruit can be more easily separated from the trees without tearing a plug from the fruit.

The fruit which is separated from the tree rolls down the arcuate teeth of the comb 72 and is received within the receptacle 41. After a substantial quantity of fruit has been harvested, it is necessary that such fruit be discharged from the receptacle. In order to do this, one or more fluid cylinders 76 are swingably mounted on the carriage 33 and each of such cylinders has a piston rod 77 the free end of which is connected by a pivot 78 to lugs 79 fixed to the rear surface of the rear wall 42 of the receptacle. When the fruit is to be dumped from the receptacle, the support frame 20 is raised and the vehicle is driven to a position adjacent to a large box or receptacle after which the fluid cylinder 76 is operated to extend the piston rod 77 and cause the receptacle 41 to swing downwardly about the pivots 48 to discharge the fruit into the box. It is apparent that the fruit could be discharged into any convenient receptacle or a conventional conveyor or chute, or could be discharged directly onto the ground if so desired.

In the operation of the device, the vehicle 10 is driven to a position adjacent to a fruit tree, the support frame 20 is raised slightly and the lift frame 17 is tilted toward the tree. This locates the picker head 40 adjacent to the lowermost branches of the tree. When the power plant 71 is operated, the cylindrical body 54 is rotated in a direction to remove fruit from the limbs of the tree and to discharge such fruit into the receptacle 41. While the cylindrical body 54 continues to rotate, the lift frame 17 is moved to a generally upright position to raise the picker head through the foliage and continue to remove mature fruit from the tree. Thereafter the support member 20 is raised while simultaneously the carriage 33 is moved in and out so that the picker head 40 follows the contour of the tree. In the event that one or more of the fingers 55 should engage a relatively large branch or limb, the clutch 65 will slip so that the cylindrical body 54 stops rotating until the continued upward movement of the picker head causes the fingers to pass the obstruction. As soon as the obstruction is cleared, the cylindrical body again rotates with no damage having occurred either to the tree or to the picker head mechanism.

Many orchards have several varieties of fruit of different sizes so that one picker head 40 would not serve to harvest all of the fruit. Under these conditions, the proprietor of the orchard could have several picker heads having fingers spaced apart different distances and such picker heads are easily interchangeable by removing the bolts 52 and the upper bearing portions 51 so that the cylindrical body of the picker head is removable and a different cylindrical body can be placed within the lower bearing portions 50. Simultaneously, the bolts 75 are removed from the comb 72 and a comb having teeth spaced apart a distance corresponding to the spacing of the fingers of the new cylindrical body is then mounted on the receptacle 41.

I claim:

1. A picker head for a mechanical fruit picker comprising an elongated body for rotatable mounting on a support means, means for rotating said body in one direction about its longitudinal axis, a plurality of fingers mounted on said body and extending outwardly therefrom, said fingers being equally spaced apart a distance slightly less than the size of mature fruit to selectively remove mature fruit only from a tree, each of said fingers being curved away from the direction of rotation of said body, a comb carried by said support means and stationary relative thereto, said comb having teeth located between said fingers and permitting said fingers to pass between said teeth when said body is rotated, said teeth being curved so that the angle between said teeth and said fingers is at least 90°, whereby mature fruit engaged by said fingers is removed from the tree.

2. The structure of claim 1 in which said support means includes a receptacle on which said body and said comb are removably mounted and which receives the fruit removed from the trees.

3. The structure of claim 1 in which said body is generally cylindrical.

4. The structure of claim 3 in which said fingers are spirally mounted on said body.

5. The structure of claim 1 in which said fingers are removably mounted on said body.

6. The structure of claim 1 in which said body and said comb are removably mounted on said support means so that another body and cooperating comb having a spacing to accommodate different size fruit can be mounted thereon.

7. The structure of claim 1 in which the teeth of said comb terminate adjacent to said body.

8. A picker head for a mechanical fruit picker comprising a receptacle, a generally cylindrical body rotatably and removably mounted on said receptacle, means for rotating said body in one direction about its longitudinal axis, a plurality of independent fingers spirally mounted on said body and extending outwardly thereof, said fingers being spaced apart a selected distance so that they remove mature fruit only from a tree, each of said fingers being curved away from the direction of rotation of said body, a comb removably mounted in fixed position on said receptacle, said comb having teeth located between the fingers of said body and terminating adjacent to said body, and said teeth being curved so that the angle between said teeth and said fingers is at least 90° during the entire time that said fingers are passing said teeth, whereby selected fruit only is separated from the tree and rolls down said teeth into said receptacle.

* * * * *